June 12, 1956 R. C. RUSSELL 2,749,891
AUTOMATIC LENGTH ADJUSTING MECHANISM
Filed July 19, 1952 3 Sheets-Sheet 2
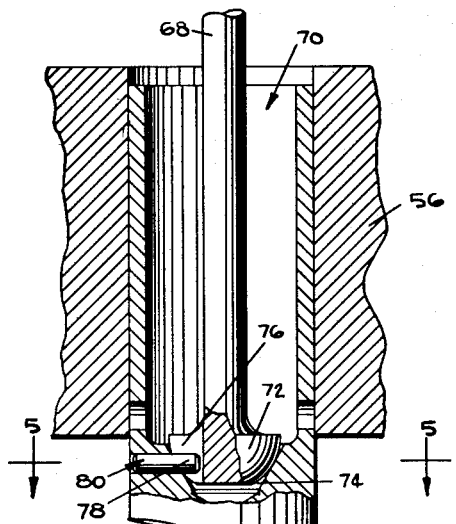
FIG_4
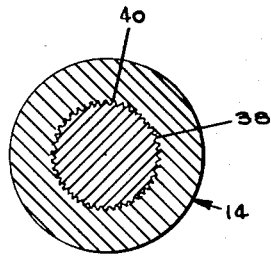
FIG_3
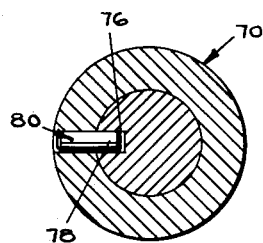
FIG_5
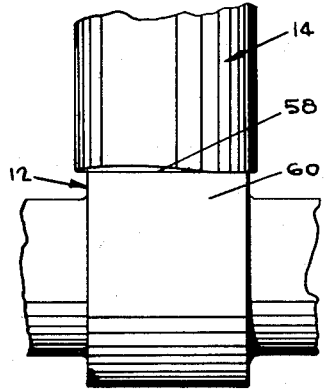
FIG_2
INVENTOR.
ROBERT C. RUSSELL
BY
McDonald & Teagno
ATTORNEYS

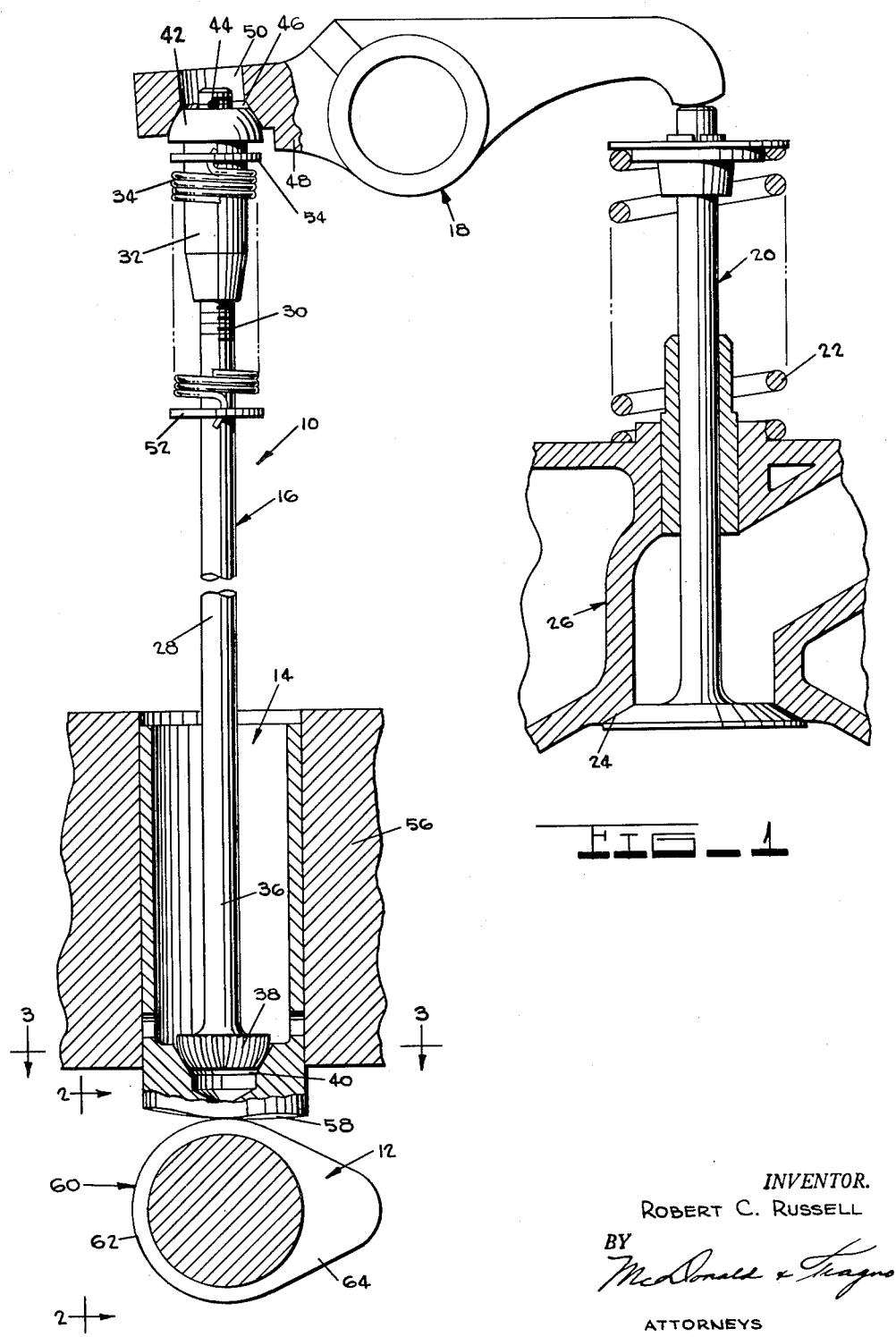
FIG_1

INVENTOR.
ROBERT C. RUSSELL

United States Patent Office 2,749,891
Patented June 12, 1956

2,749,891

AUTOMATIC LENGTH ADJUSTING MECHANISM

Robert C. Russell, South Euclid, Ohio, assignor to Eaton Manufacturing Company, Cleveland, Ohio, a corporation of Ohio Application July 19, 1952, Serial No. 299,790

10 Claims. (Cl. 123—90)

This invention relates to length adjusting mechanism and more particularly to means for automatically compensating for the variation in length of operating components of valve operating mechanism for internal combustion engines.

Broadly the invention comprehends the provision of means in the form of a torsion spring loaded screw and nut assembly incorporated in the component members of a valve operating mechanism and wherein through a prescribed turning of one member of the screw and nut assembly relative to the other member thereof a shortening or elongating compensation for the valve operating mechanism is attained. As a means of insuring for the rotation of one of the members of the assembly as occasioned by the turning movement imparted by a cam to a tappet of the valve operating mechanism the member has a large friction area coupling engagement with the tappet or is positively coupled to the tappet for rotation simultaneously therewith. A predetermined arrangement in shape or radius of contact between the mating surfaces of the tappet and cam account for the turning movement imparted to the tappet by the cam.

Although numerous automatic valve operating mechanism length compensating means have been devised utilizing a torsion spring loaded screw and nut assembly none have provided specifically for a structural arrangement wherein either one or the other of the screw or nut of the assembly is assuredly coupled to the tappet whereby any rotative movement imparted thereto is directly transmitted to said nut or screw for the rotation thereof. This coupled rotation has proven to be an essential improvement to thus insure against false or ineffective length adjustment which might otherwise occur.

Among the several objects of the invention are the provision of automatic valve operating mechanism length compensating means, that:

1. Includes a torsion spring loaded nut and screw assembly with positive simultaneous occurring between a tappet of the mechanism and the nut or screw with which it is associated;

2. Easily and effectively compensates for expansion, wear and contamination tending toward malfunctioning of the mechanism;

3. Includes a tappet engageable by a cam, effective through provision between the mating surfaces of the tappet and cam to rotate the cam as requirements for the shortening of valve operating mechanism occurs;

4. Includes a tappet and torsion spring loaded screw and nut assembly with one member of the assembly coupled to the tappet insuring against relative rotation thereto, while permitting limited angular movement relative thereto; and 5. Includes a torsion spring loaded nut and screw assembly adapted to be arranged intermediate a tappet and a rocker arm with frictional engagement between the nut and screw, and tappet and rocker arm with which it is associated and wherein the frictional engagement between the tappet and its associated screw or nut is greater than between the rocker arm and its associated screw or nut.

Other objects and advantages of the invention will appear from the following description taken in connection with the drawings forming a part of the specification, and in which:

Fig. 1 is a partly elevational, partly cross-sectional view of a valve operating mechanism incorporating automatic length compensating means therein which embody the invention;

Fig. 2 is a fragmentary end elevational view taken substantially along lines 2—2 of Fig. 1;

Fig. 3 is a cross-sectional view taken substantially along lines 3—3 of Fig. 1;

Fig. 4 is a vertical cross-sectional view of a modified form of coupling between the tappet and screw of the screw and nut adjusting assembly from that of Fig. 1;

Fig. 5 is a cross-sectional view taken substantially along lines 5—5 of Fig. 4.

Similar reference characters indicate corresponding parts throughout the several views of the drawings.

Figure 6:
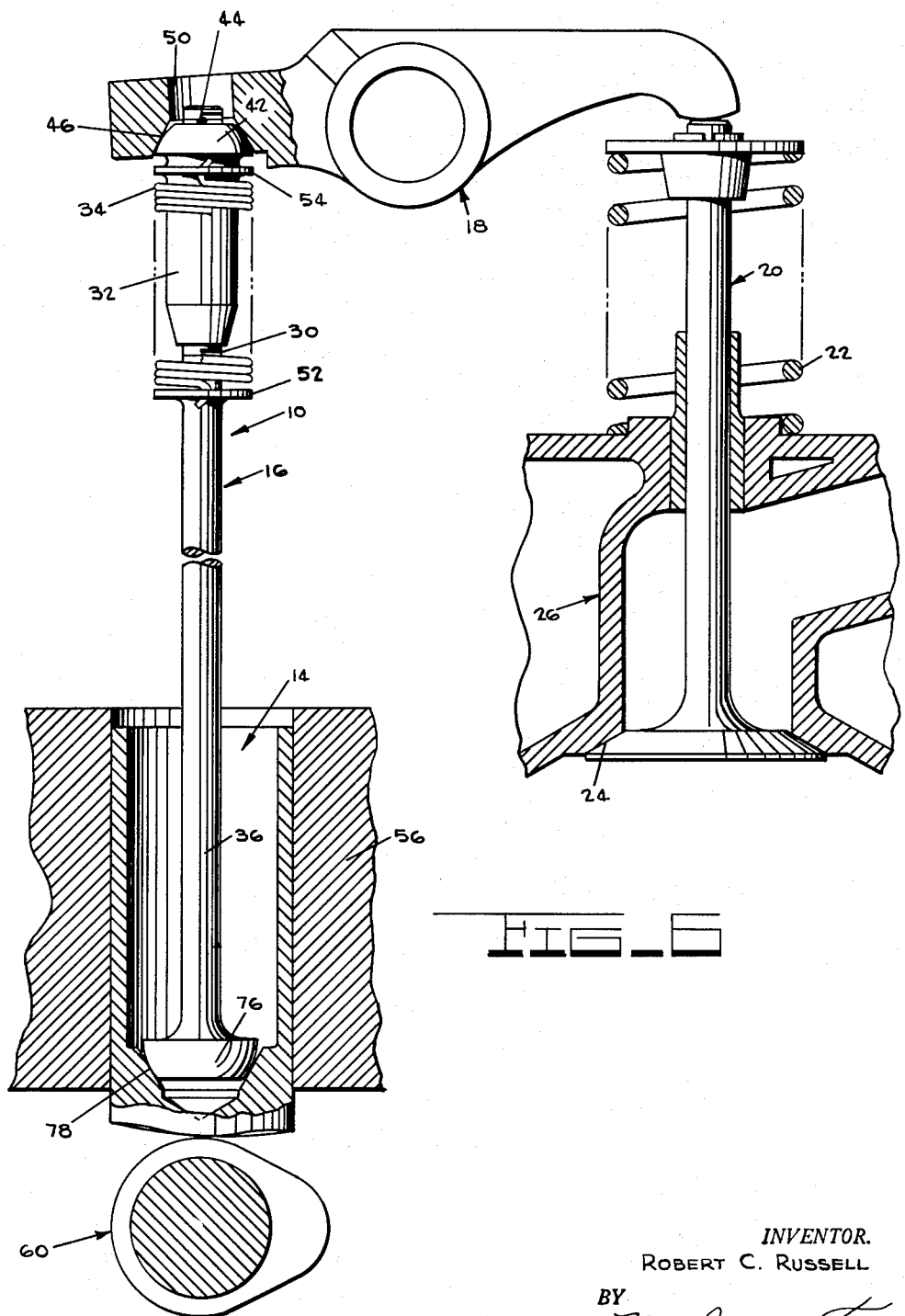
Fig. 6 is a partly elevational, partly cross-sectional view of a valve operating mechanism incorporating automatic length compensating means therein, modified slightly from that of Fig. 1.

Referring to the drawings for more specific details of the invention 10 represents generally a valve operating mechanism for an internal combustion engine comprising as component members thereof a cam 12, a tappet 14, a pushrod assembly 16, a rocker arm 18 and a valve 20.

As will be noted in viewing Fig. 1 the valve operating mechanism is shown virtually at rest wherein the cam has moved to its base circle and the valve has been actuated by valve spring 22 to closed position on its seat 24 in engine block 26.

The pushrod assembly 16 includes a preferably slender screw element or member 28 having a screw threaded portion 30 at one end thereof, a nut element or member 32 threadingly engageable upon the screw threaded portion of element 28 and a torsion spring 34 interconnected between the nut and screw elements normally biasing them apart from one another.

The screw element 28 includes in addition to the screw threaded portion, an opposite axially extended portion 36 terminating at its extremity 38, opposite axially disposed from the threaded portion, in an outer surface serrated partially spherical shape. The serrated surface end 38 of the screw element is received in a conical shaped socket 40 formed internally of the tappet 14 near the closed end thereof. The serrated end 38 of screw element 30 is made of such hardness relative to the socket 40 whereby the serrations become partially embedded in the socket and restrain the screw element and tappet from relative rotation to one another while at the same time permitting slight angular movement therebetween.

The nut element 32 in being threaded upon the screw element is normally positioned within the axial confines of the screw element such that a part of said threaded portion of the screw element protrudes axially outwardly beyond the outer end 42 of the nut element. A thread obstruction 44 is provided near the extremity of the threaded portion of the screw element serving to inhibit movement of the nut element off of the screw element and thus establishing the maximum extent to which adjustment for lengthening of the pushrod can be made.

A spherical surface is provided upon outer end 42 of the nut adapted to have annular line bearing engagement with a conical shaped socket 46 formed as part of one arm 48 of rocker arm 18. With the threaded portion of screw element 28 extending axially beyond the nut element 32 and with the spherical end 42 of the nut element in bearing relation in socket 46 of the rocker arm, the threaded portion is received in an aperture 50 in the rocker arm concentric with the socket.

The torsion spring 34 is arranged in telescoping relation to the nut and screw elements under load with its opposite extremities secured respectively upon a collar 52 of the screw element and a collar 54 of the nut element tending to bias the screw and nut elements apart from one another. The pre-load of the spring is to be of an amount sufficient to permit of elongation of the pushrod to the extent of adjustment permitted.

The screw and nut elements are for illustration and explanation purposes, deemed to be threaded left-handed as shown by Fig. 1 and preferably are to be of as low an angle as possible, such for example as 3/16–20 threads.

Tappet 14 is supported for reciprocation in a tappet guide 56 and as such is free to rotate therein without interference.

Means providing for rotation of the tappet 14 as imparted thereto by engagement of cam 12 therewith is of the structure more specifically disclosed and claimed by my co-pending application Serial No. 278,339, filed March 25, 1952, now Patent No. 2,679,239 wherein the tappet has a cam or more specifically helical surface 58 provided on one end thereof oppositely disposed from socket 40 thereof adapted for engagement by a surface 60 of cam 12. Surface 60 of cam 12 is flat throughout a surface of revolution parallel to the axis of the cam for both the base circle and lobe portions 62 and 64 respectively of the cam. By making surface 58 of tappet 14 helical in form, the lobe portion 64 of surface 60 of cam 12 is so engageable with the cam surface 60 as to provide for an oscillating movement of the tappet when a predetermined load is imposed upon the tappet and cam. Because of the helical surface 58 of the tappet, the surface 60 of the cam assumes a substantially full line contact therewith for all relative positions between the engaging surfaces of the cam and tappet, whereby as the cam is rotated a simulated relative threading or turning action occurs between the cam and tappet, and since the peripheral surface 60 of the cam follows a fixed path parallel to the axis of the cam, the tappet is made to turn relative thereto across the full helical surface on the tappet.

The pitch of the helical surface 58 of the tappet is purposely made small, although the drawing for the purpose of illustration shows this in exaggerated size, since the turning of the tappet in a counter-clockwise direction is directly transmitted to the screw element 28 whereby through the use of a left-hand threading engagement between the screw and nut elements a shortening of the assembly 16 will occur. In this way the lift loss introduced into the valve operating mechanism will be of an amount sufficient to compensate for length adjustment requirements thereof but not sufficient to appreciably effect valve operation.

In a normal operation of the valve operating mechanism of Fig. 1 assuming that as shown the component valve 20, rocker arm 18, pushrod assembly 16, tappet 14 and the cam 12 are in zero clearance engagement with one another and with no other load than that of torque spring 36, a rotation of the cam in a clockwise direction from the position shown will immediately bring the lobe 64 into engagement with the tappet surface 58. With the lobe 64 engaging the tappet surface tending to lift the tappet and other components of the valve operating mechanism associated therewith, the load of spring 22 by way of the valve, rocker arm, pushrod and tappet will be imposed on the tappet and cam engaging surfaces, such that with substantially line contacting relation between said surfaces a further rotation of the cam in the course of its rotation throughout a valve lifting and closing cycle will cause a screwing or threading relation between the helical surface of the tappet and the engaging surface of the cam. The screwing relation between the tappet and cam results from the line or zone of contact between the tappet and cam engaging surfaces moving up and down the surface 60 of lobe 64 and back and forth across the tappet surface 58, that is from approximately a center portion of the tappet out to its peripheral edge and back again to center, with the lifting portion of the lobe engaging the tappet surface, in viewing Fig. 1, to the left of a plane perpendicular to the drawing passing through the axis of the tappet whereas the closing portion of the ramp engaging the tappet surface is to the right of the same plane. Actually during a rotation of the cam the tappet is rotated back and forth or oscillated during both a lifting and closing cycle thereof but since the frictional resistance imposed on the threads for the threading apart thereof is greater than the resistance between the friction connection of either the screw element with the tappet or the nut with the rocker arm no threading apart occurs. The oscillation of the tappet for the lifting and closing cycles of operation thereof as engaged by the cam occurs as a result of the movement of line contact between the peripheral surface of the cam and tappet moving approximately from a line crossing the axis of the tappet to a line approximately tangential to the outer periphery of the tappet and back again to the center line wherein the cam has moved from its base circle to the apex of the lobe. A like operation results from movement of the cam between apex engagement with the tappet at approximately its center line to base circle engagement therewith near its center line. As a result of the tappet being turned counter-clockwise through a predetermined angle it effects by way of the serrated connection between the tappet and screw element to rotate the screw therewith, and in view of the left-hand thread relation between the screw and nut elements a threading up between said elements occurs resulting in a shortening of the pushrod assembly since the frictional resistance between the nut element and rocker arm and between the screw and tappet is greater than the resistance to threading up between the screw and nut elements.

At the conclusion of the valve closing position of a valve operation the cam moves to its base circle whereupon the load of the valve spring 22 is removed therefrom. During the course of rotation of the cam at its base circle association with the tappet surface 58, the lift loss introduced into the valve operation by the shortening of the pushrod assembly has either been compensated for by this time by an equal expansion which may have occurred in the mechanism or the spring 34 operates to elongate the pushrod assembly to return the valve operating mechanism to zero clearance condition at base circle of the cam and thus restore the lift loss amount introduced or account for any contraction or wear that might possibly occur in the mechanism. In the elongation operation of the pushrod the spherical end 46 of the nut element is free to rotate relative to its friction seating connection with the rocker arm and thus readily compensate without requirement of turning the tappet relative to the cam at this time.

Through the provision of positively securing the end 38 of the screw element of the pushrod in the socket 40 of the tappet, a coupled rotation of the tappet and the screw element as a unit is assured whereby the screw as rotated overcomes the combined turning resistance offered by the threads of the screw and nut elements in a threading together thereof and the pre-load of torsion spring 34.

The friction between the spherical end 42 of the nut element and the socket 46 of the rocker arm is to be of an amount sufficient to resist the turning resistance between the threads of the screw and nut elements as regards the action of the screw element threading into the nut element for a shortening operation of the pushrod wherein the screw element is positively rotated simultaneously with the tappet.

The friction engagement had between the spherical end of the nut element and the socket of the rocker arm is purposely made of an annular line bearing nature so as to prevent oil film formation between these surfaces which would ordinarily tend to destroy an established friction relation therebetween especially since the continued maintenance of a substantially predetermined friction is essential to proper operation of the adjusting device and the valve operating mechanism.

Thread obstruction 44 in addition to maintaining the screw and nut elements in coupled assembly prior to installation and use in a valve operating mechanism also insures against over adjustment which might otherwise occur if the valve was caused to be stuck open and thereby prevents any serious damage to the engine block.

Figs. 4 and 5 illustrate a modified form of coupling arrangement between an element 68 of a screw and nut assembly and a tappet 70 wherein a partial spherical shaped end 72 of element 68 is adapted to be received in a socket 74 in tappet 68. The end 72 of the element 68 is provided with an axial slot 76 within which is received one end 78 of a pin 80 secured in the body of tappet 70. With the pin 80 in slot 76 as seen in Figs. 4 and 5 the element and tappet are required to rotate together as a unit whereas at the same time angular relative movement in one plane is possible between the element and tappet. This permissible angular movement is necessary to account for angular displacement of the screw and nut assembly resulting from the operation thereof as is occasioned by the arrangement of the pushrod 16 between the tappet and rocker arm as disclosed by Fig. 1. The structure of Fig. 4 can be substituted for the tappet and element coupled together structure of Fig. 1 with a like resultant operation.

Fig. 6 illustrates a structure differing from that of Fig. 1 in that instead of providing a positive securing means in the form of serrations 38 on the end of screw 16 adapted to become securely embedded in the wall of cavity 40 of tappet 14 an enlarged partly spherical surfaced end 76 is formed on the end of screw element 16. The surface 76 of screw element 16 is adapted to have line bearing engagement with the annular wall of a conical shaped socket 76 formed in tappet 14. The frictional holding or rotative turning resistance between tappet 14 and screw element 16 is greater than that between spherical surfaced end 42 of nut element 32 and the angular wall of socket 46 in rocker arm 18 because of the fact that the nut element-tappet arrangement 76—78 has a larger torque or radius arm than the screw element tappet arrangement 42—46. As such assurance is had for the coupled or frictional engagement turning relation between the tappet 14 and screw element 16 in that rotation of the nut and screw elements as a unit relative to the rocker arm will occur under normal conditions solely between the spherical surface end 42 of nut element 32 and socket 46 of the rocker arm.

Aside from the variance in the end of the screw element 16 and socket of the tappet 14 the structure of Fig. 6 is similar to that of Fig. 1 and the operation of the mechanisms represented thereby is substantially identical and accordingly the aforementioned operation will suffice as well herefor.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A valve operating mechanism comprising a threadingly engaged screw and nut member assembly, a spring normally biasing the screw and nut members apart, intermediate valve-actuating means engageable with an end of one of said members, a tappet secured to one of the members for rotation therewith allowing angular movement but preventing rotation between said one member and tappet, said tappet having a cam engaging surface, and a cam having a peripheral surface engageable with the surface on the tappet, said tappet and cam engageable surfaces being of such related configuration so as to provide for rotation of the tappet to shorten said member assembly as said tappet is raised and rotated by said cam under certain conditions of operation of the valve operating mechanism.

2. A valve operating mechanism comprising a threadingly engaged screw and nut member assembly, a spring normally biasing the screw and nut members apart, a tappet positively coupled to one of the members for rotation therewith but formed separately therefrom, and a cam engageable with the tappet providing for the rotation thereof to shorten said member assembly as said tappet is rotated by said cam.

3. A mechanism according to claim 2 wherein the coupling arrangement between the tappet and member includes a serrated surface on one end of said member and a socket in the tappet with the serrated surface in impressed non-rotative securement in the surface of the socket.

4. A mechanism according to claim 2 wherein the coupling arrangement between the tappet and member inhibits relative rotation therebetween while permitting relative angular movement therebetween.

5. A valve operating mechanism comprising a pushrod having a threadingly engaged screw and nut member assembly, a spring normally biasing the screw and nut members apart, a rocker arm engageable with an end of one of the members, a tappet formed separately from but rotatably secured to an end of the member not engaged by the rocker arm, with the resistance to relative rotation between the tappet and its associated member being greater than between the rocker arm and its associated member and means to impart rotation to said tappet so as to shorten said member assembly as said tappet is raised and rotated by said rotation-imparting means.

6. A mechanism according to claim 5 wherein the rocker arm and an end of the associated member are frictionally engaged with one another.

7. A mechanism according to claim 6 wherein the rocker arm has a conical walled socket therein and the associated member of the rocker arm has a spherical shaped surface on one end engageable with the wall of the socket in the rocker arm and the tappet has a conical walled socket therein and the associated member of the tappet has a spherical shaped end, and radially disposed pin means positively and rotatably interconnecting said tappet and said associated member of the tappet but allowing angular movement therebetween.

8. A valve operating mechanism comprising a threadingly engaged screw and nut member assembly, a spring normally biasing the screw and nut members apart, a tappet positively connected to one of the members providing for conjoint rotation of the tappet and the member with which it is connected but allowing angular movement therebetween, a rocker arm engageable with the other of the members, and a cam engageable with the tappet providing for the rotation thereof to shorten said member assembly as said tappet is raised and rotated by said cam.

9. A valve operating mechanism comprising a threadingly engaged screw and nut member assembly, a spring normally biasing the screw and nut members apart, a tappet, means positively securing the tappet to one of the members for conjoint rotation but allowing angular movement therebetween, a rocker arm engageable with the other of the members, and a cam engageable with the tappet providing for the rotation thereof to shorten said member assembly as said tappet is raised and rotated by said cam.

10. A valve operating mechanism comprising a threadingly engaged screw and nut member assembly, a spring normally biasing the screw and nut members apart, a tappet, means engageable between the tappet and one of the members interconnecting said tappet and member providing for the positive rotation of said tappet and said one member as a unit but allowing angular movement therebetween, a rocker arm engageable with the other of the members, and a cam engageable with the tappet providing for the rotation thereof to shorten said member assembly as said tappet is raised and rotated by said cam.

References Cited in the file of this patent

UNITED STATES PATENTS

| | | |
|---|---|---|
| 1,077,052 | Dodds | Oct. 28, 1913 |
| 1,143,794 | Swenson et al. | June 22, 1915 |
| 1,820,890 | Spiller | Aug. 25, 1931 |
| 2,121,525 | Johnson | June 21, 1938 |
| 2,322,514 | Goodwin | June 22, 1943 |
| 2,404,478 | Engemann | July 23, 1946 |